United States Patent [19]

Müller

[11] 4,281,760
[45] Aug. 4, 1981

[54] SLAT CONVEYOR BELT FOR SLAT CONVEYORS

[76] Inventor: Hugo S. Müller, Oettinger Str. 9, 8860 Nördlingen, Fed. Rep. of Germany

[21] Appl. No.: 943,735

[22] Filed: Sep. 19, 1978

[30] Foreign Application Priority Data

Sep. 21, 1977 [DE] Fed. Rep. of Germany ....... 2742428

[51] Int. Cl.³ .............................................. B65G 15/30
[52] U.S. Cl. ..................................... 198/846; 411/173
[58] Field of Search ....................... 198/844, 848, 846; 151/41.72, 41.73

[56] References Cited

U.S. PATENT DOCUMENTS

| | | | |
|---|---|---|---|
| 1,883,906 | 10/1932 | Hasselquist | 151/41.72 X |
| 3,976,192 | 8/1976 | Müller | 198/844 |

FOREIGN PATENT DOCUMENTS

| | | | |
|---|---|---|---|
| 1159847 | 12/1963 | Fed. Rep. of Germany | 198/844 |
| 1569205 | 5/1969 | France | 151/41.72 |

*Primary Examiner*—Joseph E. Valenza
*Assistant Examiner*—Douglas D. Watts
*Attorney, Agent, or Firm*—Manfred M. Warren; Robert B. Chickering; Glen R. Grunewald

[57] ABSTRACT

For slat conveyors in which transverse slats are supported on closed loop carrying straps which circulate in the conveying direction, there is the need to removably secure the slats to the conveying straps. Fixing means which allow the slat to be removable, such as nut and bolt pairs hitherto have been impractical due to the inaccessibility in the use of the lower one of the pair, i.e. from below the conveying strap (once it is installed in the conveyor). By now forming the nut as a threaded nipple embedded in the conveying strap the need for access to the nut is obviated. The nipple receives a fixing screw passed through the slat. The nipple is arranged to be rotationally locked relative to the strap, optionally by ribs. A pair of nipples and a tooth for engagement with a tooth-engaging-roller, may be formed integrally by injection moulding techniques and self-tapping screws may be employed.

1 Claim, 4 Drawing Figures

SLAT CONVEYOR BELT FOR SLAT CONVEYORS

BACKGROUND OF THE INVENTION

1. Field of Invention

The invention relates to slat conveyor belts for slat conveyors.

2. Description of Prior Art

In slat conveyors, such as are used especially in the textile industry and also for the transporting of, for example, packages or the like, the conveyor belt possesses a plurality of carrying straps circulating parallel to one another in the conveying direction, on which are fixed closely spaced slats oriented transversely to the conveying direction. Teeth may also be mounted on the lower face of the carrying straps at predetermined intervals in general in the region of each slat, thus providing the action of toothed belts, which are driven by corresponding toothed rollers and ensure an extremely accurate synchronization of the conveyor belt.

For the fixing of the slats to the carrying straps, notch or snap connectors have proved eminently successful consisting of heads permanently fixed to the carrying straps, the slats being engaged onto these heads by means of a notch profile formed on their lower face. These permit very rapid assembly of the conveyor belt, and moreover it is also readily possible to replace individual slats in the case of a defect, by simply pulling the damaged slat off its head from the upper side of the conveyor belt and engaging a new slat.

There are many cases, however, in which such notch connectors can be used not at all or only to a limited extent. This applies especially where, during running, an upwardly directed moment can be exerted upon the slats, giving rise to a risk of the slats coming off their heads. In such cases, the fixing of the slats to the carrying straps is normally provided by means of screw connectors or rivet connectors, which are passed through corresponding bores in the slats and the carrying straps. With such connecting components however, the decisive advantages of the notch connection, in particular in regard to the easy replacement of individual slats are lost, since both the known types of screw connectors and also the rivets that are suitable for the fixing of the slats require access both to the upper side and also to the lower side of the conveyor belt for the replacement of a slat. Since in general, access to the under face of a conveyor belt can normally be obtained only with great difficulty, not least on account of the frequently large width and very flat construction of the slat conveyors under discussion here, the replacement of individual slats in the case of the known screw connectors or rivet connectors always presents a considerable problem.

SUMMARY OF THE INVENTION

The present invention seeks in its preferred embodiment to create a slat conveyor belt, wherein the preventing of unintentional loosening of the slats from the carrying straps is equally good as with the known screw connectors or rivet connectors, but in which also the replacement of individual slats can be carried out with access to the upper face only of the conveyor belt.

According to the present invention there is provided a slat conveyor belt for slat conveyors, comprising a plurality of carrying straps arranged to circulate in the conveying direction and slats extending transversely across the conveying direction and resting upon the carrying straps, said slats being fixed to the carrying straps by means of a plurality of screw connections passing through bores in the slats, wherein the nut for each screw connection is formed as a threaded nipple fixed to the surface of the corresponding carrying strap, which nipple receives the fixing screw passed from above through the bore in the slat and penetrates into a widened-out portion at the lower end of this bore.

In an embodiment of the invention there is provided for the purpose of fixing the slats, a special screw connector, the particular feature of which lies in the fact that the nut forming part of such a connector is formed, not as a free component laid against the under face of the carrying strap, but as a component in the form of a threaded nipple firmly anchored at a predetermined position on the carrying strap. If, in a slat conveyor constructed in this manner, a slat needs to be replaced, this can now be done from the upper side only of the conveyor belt, by first undoing all the fixing screws of this slat, then lifting the relevant slat, then replacing a new slat in position, and finally tightening up the fixing screws again into the threaded nipples. No operations on the lower face of the conveyor belt are necessary in this procedure.

The anchoring of the threaded nipples to the carrying straps can be effected in a great variety of ways. One useful method is to construct each threaded nipple as a tubular rivet, which is pushed from above through a bore in the carrying strap and is expanded on the lower face of this strap. Alternatively, the threaded nipples can be screwed onto the lower face of the carrying strap or can be glued to the carrying strap or, if they are of a plastic material, can be injected onto the carrying strap. If teeth are provided on the carrying strap, there are further advantageous possibilities in that the threaded nipples can also be incorporated as the fixing for these teeth, or the threaded nipples may be produced in one piece with the teeth and then connected in the form of this integral unit to the carrying strap.

The threaded nipples must not of course rotate when the fixing screws are operated. To meet this requirement, however, it is not essential to have an absolutely nonrotatable anchorage of the threaded nipple to the carrying strap, but the requirement can easily be satisfied by the threaded nipple additionally being connected by friction or in a close-fitting manner with the inner surface of the lower widened-out portion of the bore in the slat, into which it penetrates. Such an additional measure is especially suitable when single threaded nipples are used, the absolutely non-rotating anchorage of which to the carrying straps cannot always be adequately ensured. If by contrast, the threaded nipples are combined into pairs (for example when two threaded nipples together with one tooth are made from one component), or when an absolutely non-rotating anchorage of the threaded nipple to the carrying strap can be achieved in some other simple manner (for example when the threaded nipples are injection moulded through non-circular holes of the carrying strap), such an additional measure is not necessary.

For the purpose of securing the fixing screws passing through the individual bores in the slats, it may be advantageous to choose these bores slightly smaller than the external diameters of the screws, so that a certain interference is already present between these two components. The screws may also be formed as self-tapping screws, in which case they themselves form the thread inside the threaded nipple. Such a screw connection is in general, by its very nature also an interference fit, so that sufficient reliability against unintentional loosening of the fixing screws is provided, and moreover the advantage of a simpler form of construction of threaded nipples results. Alternatively, the thread of the nipples may also be furnished with a bruising in the manner of a stop nut, or it can itself be formed as self-tapping, in which case the fixing screws can then be accordingly more simply constructed. Any other conventional measures for securing a screw connector are also possible.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

DETAILED DESCRIPTION OF THE INVENTION

Figure 1:
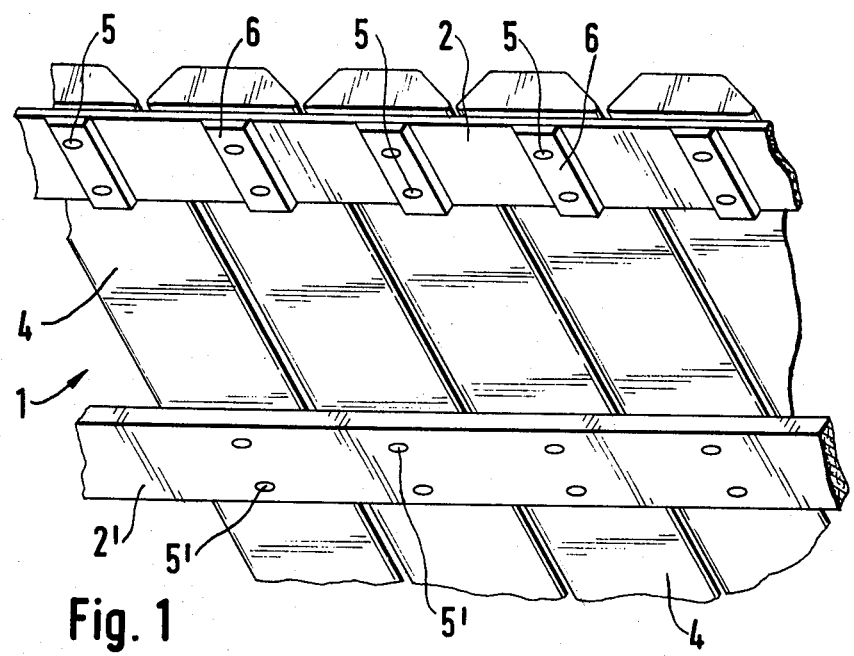
FIG. 1 shows a perspective view of a portion of a slat conveyor belt from below.

FIG. 1 shows a portion of a typical slat conveyor belt 1, viewed obliquely from below. It comprises carrying straps 2 and 2' onto which slats 4 are laid close together and transversely to the conveying direction and are fixed to the straps. In general, two fixing points 5 and 5' are provided per carrying strap and slat.

The carrying strap 2 at the lateral edge of the conveyor belt 1 is furnished with teeth 6, each of which is fixed approximately at the center of a slat on the lower face of the strap, and with advantage using the same fixing means as are used at fixing points 5 for fixing the slats. The second carrying strap 2' shown in FIG. 1 represents a form of construction without teeth. The conveyor belt may, depending upon its type, comprise exclusively toothed straps of the type of carrying strap 2 or exclusively simple carrying straps 2' or may possess both types of strap.

Figure 2:
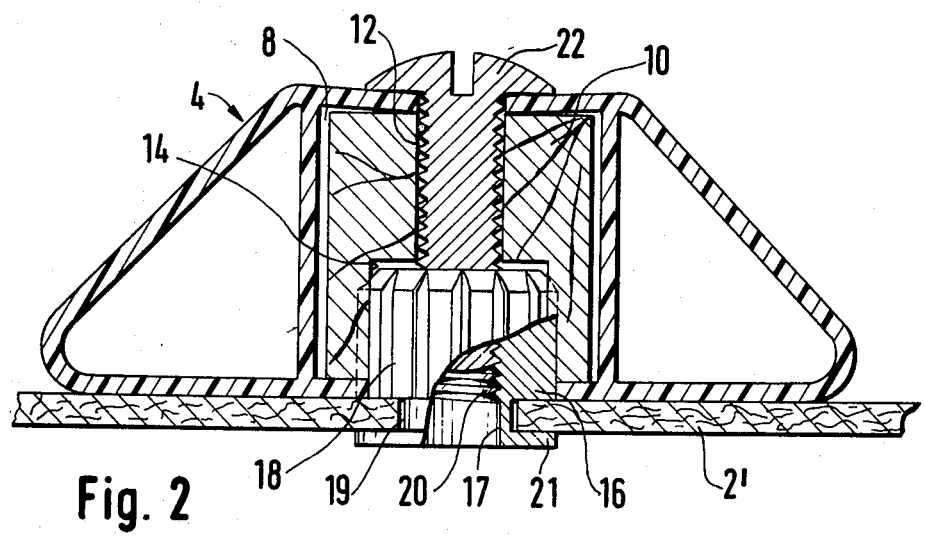
FIG. 2 shows a cross-section through the means of fixing of a slat to the carrying strap lying below it.

In FIG. 2, a first embodiment of one of the fixing points 5' is shown. Here, the slat 4 is constructed as a continuously extruded plastic section, which possesses in its center a cavity 8, into which a wooden batten 10 is pushed, for example to enable teeth to be attached to the slat 4 for the production of a toothed belt.

For each fixing point, a bore 12 is formed in the center of the slat 4, changing at its lower end into a widened-out portion 14. In this widened-out portion 14, a threaded nipple 16 is seated, which is furnished with a central bore and, in the example of FIG. 2, is riveted to the carrying strap 2'. For this purpose, the lower shank 17 of the threaded nipple 16 is formed as a tubular rivet and, after it has been pushed from above through an opening 19 in the carrying strap 2', is expanded to overlie the lower face of the carrying strap. If the carrying strap is additionally to be equipped with teeth 6, in other words the fixing points are to be those indicated at 5 in FIG. 1, then the lower shank 17 of the threaded nipple 16 is made correspondingly longer so that the teeth 6 can also be secured to the carrying strap 2 by the same riveted connection. The principle of this possibility is shown for another example of embodiment of the invention in FIG. 4.

The central bore of the threaded nipple 16 is furnished with a thread 20, which serves for seating a fixing screw 22. This screw extends from the upper side of the slat 4 through the bore 12 and into the threaded nipple 16 and is operated only from the upper side of the slat 4, without it being necessary to hold up the threaded nipple 16 or carry out any other operation at the lower side of the carrying strap 2'. To prevent an unintentional loosening of the screw 22, the diameter of the bore 12 may be kept slightly smaller than the external diameter of the screw, or other usual securing measures for screw connections can be used.

The riveted connection shown in FIG. 2 between the threaded nipple 16 and the carrying strap 2' can itself be formed to be absolutely non-rotating. In order that this riveted connection need not be unnecessarily complicated, and in addition to ensure that the threaded nipple 16 always remains non-rotating in a manner sufficient for the operating of the fixing screw 22, even under difficult conditions such as can occur, for instance, after long use of the conveyor belt, the threaded nipple 16 is additionally anchored as a close fit in the widened-out portion 14 of the bore 12. For this purpose, the outer surface of the threaded nipple 16 is furnished with longitudinal ribs 18, the diameter of which is chosen so that its tips penetrate into the inner surface of the widened-out portion 14, when the slat 4 is pressed with sufficient force onto the carrying strap 2'. In this manner, rotation of the threaded nipple 16 is prevented with sufficient reliability.

In the embodiment shown in FIG. 3, two adjacent threaded nipples 16' (only the front one is visible in this view) together with the tooth 6 provided below the carrying strap 2 comprise a single component. As shown the threaded nipples 16' are substantially cylindrical and possess, at their periphery, radially outward projecting ribs 24, which have a triangular shape and extend their maximum radial extent directly above the carrying strap 2. The dimensions of these ribs 24 are so chosen that the largest diameter formed by them is greater than the opening 19 in the carrying strap 2 and their common smallest diameter is just as large as this opening. Between the lower edges of the ribs 24 and the tooth 6 below them, a groove 26 is provided, the width of which is equal to the thickness of the carrying strap 2.

In order to fix the component consisting of the threaded nipples 16' and the tooth 6 to the carrying strap 2, the threaded nipples are pushed from below against the resistance provided by the diverging ribs 24 into the corresponding openings 19 of the carrying strap 2, until the edges of the openings 19 engage in the groove 26. The threaded nipples 16' can then be removed only by using exceptional force, which will never be reached in normal operation, in particular even when changing a slat 4.

Figure 3:
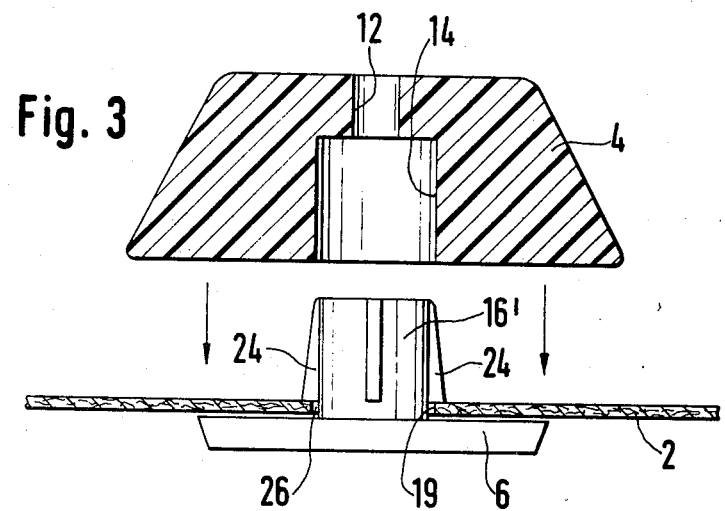
FIG. 3 shows a cross-section of a further embodiment of a fixing means before assembly.

In the embodiment of FIG. 3, no additional means to prevention of rotation of the threaded nipples 16' is required, since they remain non-rotating due to their paired connection by means of the tooth 6 to the carrying strap 2. Instead of the common tooth 6, however, each threaded nipple 16' can also be formed as a single nipple and furnished with its own flange, in which case the threaded nipples 16' are pushed individually either with or without simultaneous fixing of a tooth 6 into the corresponding openings 19 of the carrying strap 2. In such a case, a modification not shown in the drawing for securing the nipple against rotation is in general necessary. For this purpose, with great advantage, the ribs 24 can be used by making the lower widened-out portion 14 of the bore 12 of the slat 4 of such a size that the ribs 24, when the slat 4 is pressed on, can become connected in a form-fitting manner or as a frictional fit with the inner surface of the widened-out portion 14.

In the threaded nipple 16' a fixing screw (not shown in FIG. 3) is seated in the same manner as already explained with reference to FIG. 2. The use of self-tapping fixing screws has the advantage that the component consisting of the threaded nipples 16 and the tooth 6 can be produced as a plastic injection moulding, which requires no further finishing in respect of the seating for the fixing screws, since a central blind hole can be provided in the injection operation itself.

Figure 4:
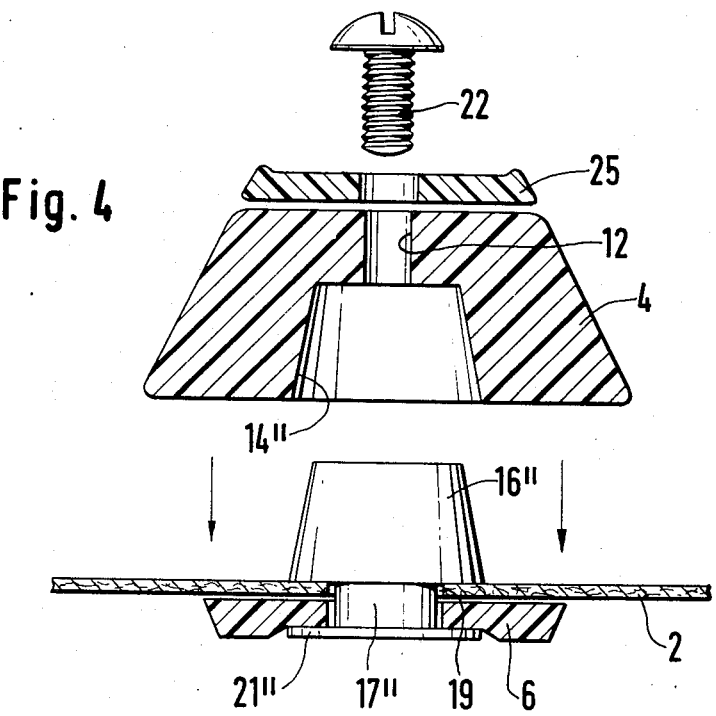
FIG. 4 shows a cross-section of a third embodiment of such fixing means before assembly.

FIG. 4 shows a threaded nipple 16", the lower shank of which is formed, similarly to the example of FIG. 2, as a tubular rivet. In the present case the threaded nipple 16" is in addition used for fixing a tooth 6 to the carrying strap 2. In addition, the threaded nipple 16" shown in FIG. 4 no longer has a cylindrical shape with an external longitudinal grooving 18, but it is shaped so as to display the external form of a truncated cone. The widened-out portion 14" co-operating with the threaded nipple 16", at the lower end of the bore 12 in the slat 4, accordingly possesses a similar conical internal surface, and the dimensions are so selected that, just before the slat 4 comes to rest upon the carrying strap 2, a clamping effect occurs between the external cone of the threaded nipple 16" and the internal cone of the widened-out portion 14". As far as concerns the seating of the fixing screw 22, the description given with respect to the embodiments of FIGS. 2 and 3 also applies for FIG. 4.

As an alternative to the riveting or locking engagement, the threaded nipples can also be screwed to the carrying strap. Their lower shank is then furnished with an external thread for seating a threaded nut, or a short, wide-head holding screw is inserted from below into the internal thread of the central bore of the threaded nipple. A further possible method of fixing consists of glueing the threaded nipples to the carrying strap. For example, the retaining flange 21 or 21" which appears at the lower shank of the threaded nipple after a riveting operation, alternatively may be formed as a separate component which is secured by glueing after insertion of the threaded nipples into the carrying strap. Finally, the threaded nipples, if they are constructed as plastic injection mouldings, can also be injected directly onto the carrying strap by a procedure which can most simply be carried out by using the so-called through injection process. The carrying strap is previously furnished with the openings 19 and then placed in a two-part injection mould which then forms the threaded nipples and possibly also one tooth. Where the threaded nipples are thus injected onto the strap, they may be shaped in the manner shown, for example in FIGS. 2 and 4.

The fixing screws 22, which are pushed from above through the bores 12 in the slats 4 may also, if required, be utilized for holding further components onto the upper side of the slats. Such further components are, for instance, skid strips 24 (FIG. 4) which are frequently fitted to the lateral ends of the slats 4, to protect these against abrasion against lateral guide components of the slat conveyor. The skid strips 25 may then with advantage be formed the same as the teeth 6, i.e. a single component is used for the teeth 6 and for the skid strips 25.

What is claimed is:

1. A slat conveyor belt for slat conveyors, comprising a plurality of carrying straps arranged to circulate in the conveying direction and slats extending transversely across the conveying direction and resting upon one surface of the carrying straps, said slats having bores therethrough and said bores having widened-out portions and said slats being fixed to the carrying straps by means of a plurality of screw connections passing through the bores in the slats, wherein a nut for each screw connection is formed as a threaded nipple having an expanded portion engaging the other surface of the corresponding carrying strap, said nipple having a substantially cylindrical outer surface formed by an envelope of longitudinal and radially outwardly directed ribs seated upon the nipple, said nipple outer surface having a diameter slightly larger than that of the widened-out bore portion in the slat, said slat positioned with said widened-out bore portion engaging said nipple outer surface to fix said nipple within said slat and prevent rotation when a fixing screw is inserted into the threaded nipple from above through the bore in the slat.

* * * * *

UNITED STATES PATENT AND TRADEMARK OFFICE
CERTIFICATE OF CORRECTION

PATENT NO. : 4,281,760
DATED : August 4, 1981
INVENTOR(S) : Hugo Stefan Muller

It is certified that error appears in the above—identified patent and that said Letters Patent is hereby corrected as shown below:

Column 6, line 20, after "strips" delete the number "24" and insert the number -- 25 --.

Signed and Sealed this

Thirteenth Day of October 1981

[SEAL]

Attest:

GERALD J. MOSSINGHOFF

Attesting Officer

Commissioner of Patents and Trademarks